United States Patent
Yang et al.

(10) Patent No.: US 8,605,749 B2
(45) Date of Patent: Dec. 10, 2013

(54) FRAME-MERGING APPARATUS AND METHOD

(75) Inventors: Tsung-Hsien Yang, Taichung (TW); Chia-Yu Ku, Miaoli County (TW); Ying-Dar Lin, Taipei (TW)

(73) Assignee: Realtek Semiconductor Corp., Hsinchu (TW)

( * ) Notice: Subject to any disclaimer, the term of this patent is extended or adjusted under 35 U.S.C. 154(b) by 572 days.

(21) Appl. No.: 12/493,265

(22) Filed: Jun. 29, 2009

(65) Prior Publication Data

US 2010/0142555 A1 Jun. 10, 2010

(30) Foreign Application Priority Data

Dec. 9, 2008 (TW) ................................. 97147823 A (51) Int. Cl.
*H04J 3/24* (2006.01)
(52) U.S. Cl.
USPC ............................. 370/473; 370/474; 370/476
(58) Field of Classification Search
None
See application file for complete search history.

(56) References Cited

U.S. PATENT DOCUMENTS

| | | | | |
|---|---|---|---|---|
| 6,721,355 | B1* | 4/2004 | McClennon et al. | 375/222 |
| 7,337,231 | B1* | 2/2008 | Li | 709/231 |
| 2008/0045153 | A1* | 2/2008 | Surineni et al. | 455/63.1 |
| 2008/0049654 | A1* | 2/2008 | Otal et al. | 370/311 |
| 2008/0130538 | A1* | 6/2008 | Raissinia et al. | 370/310 |
| 2009/0040930 | A1* | 2/2009 | Yonge et al. | 370/235 |
| 2009/0063804 | A1* | 3/2009 | Trainin | 711/170 |
| 2009/0201898 | A1* | 8/2009 | Gong et al. | 370/338 |

\* cited by examiner

*Primary Examiner* — Kibrom T Hailu
(74) *Attorney, Agent, or Firm* — McClure, Qualey & Rodack, LLP (57) ABSTRACT

A frame-merging method is adapted for a network that includes mesh and terminal units, in which any two units capable of communication form a communication pair, and one of the units operates as a key unit to transmit pending frames according to the frame-merging method. The frame-merging method includes: determining whether the key unit is a mesh or a terminal unit; for the communication pair recorded in each pending frame, selecting a suitable scheme from a plurality of frame-merging schemes, and extracting at least one of the pending frames from among the pending frames for use as part or all of a priority frame set; and comparing a total size of all frames included in the priority frame set with a suitable frame size, so as to determine whether the key unit is to send an aggregated frame. A frame-merging apparatus is also disclosed.

20 Claims, 7 Drawing Sheets

FRAME-MERGING APPARATUS AND METHOD

CROSS-REFERENCE TO RELATED APPLICATION

This application claims priority of Taiwanese Application No. 097147823, filed on Dec. 9, 2008, the contents of which are incorporated herein by reference.

BACKGROUND OF THE INVENTION

1. Field of the Invention

The present invention relates to frame-merging technology, more particularly to a frame-merging apparatus and method suitable for real-time applications.

2. Description of the Related Art

In response to increasing demand for real-time applications of wireless networks, IEEE (Institute of Electrical and Electronics Engineers) 802.11n recommends provision of a transmission rate as high as 600 Mbps (Megabits per second). However, while most transmission content for real-time applications includes frames of a small size, for the purpose of transmission and reception identification, regardless of how small the volume of effective data of a frame is, overhead must be attached for transmission. This not only causes waste of channel bandwidth, but also limits the degree to which throughput may be increased.

As a result, the prior art proposes three types of frame-merging schemes that perform transmission after a plurality of frames are merged, thereby increasing throughput. These frame-merging schemes include A-MSDU (Aggregated Media Access Control Service Data Unit), A-MPDU (Aggregated Media Access Control Protocol Data Unit), and A-PPDU (Aggregated Physical Packet Data Unit). However, each scheme is suitable for a particular channel having a different transmission quality and transmission characteristics due to the unique merging method employed thereby. For instance, the overhead of A-MSDU is such that if one of the MSDUs is damaged, all the MSDUs must be re-transmitted due to the fact that many MSDUs are directed to the same destination. As a result, A-MSDU is more suitable for use in ideal channels. Moreover, A-MSDU uses a lower overhead than the other two frame-merging schemes, and therefore, A-MSDU is able to exhibit a higher channel efficiency and throughput in ideal channels.

It is evident from the above that with respect to a communication system that needs to deal with channel fluctuations, it is not possible to achieve an improvement in throughput using merely a single frame-merging scheme.

SUMMARY OF THE INVENTION

Therefore, one of the objects of the present invention is to provide a frame-merging apparatus and method that can dynamically switch among a plurality of frame-merging schemes so as to increase throughput and realize high channel efficiency.

According to one aspect of this invention, the frame-merging method is adapted for a mesh network that includes a plurality of mesh units and a plurality of terminal units, in which any two units capable of communicating with each other form a communication pair, and one of the units operates as a key unit to transmit a plurality of pending frames according to the frame-merging method. The method comprises: (A) determining whether the key unit is a mesh unit or a terminal unit; (B) for the communication pair recorded in each pending frame, selecting a suitable scheme from a plurality of frame-merging schemes, and extracting at least one of the pending frames from among the pending frames for use as part or all of a priority frame set; and (C) comparing a total size of all frames included in the priority frame set with a suitable frame size, so as to determine whether the key unit is to send an aggregated frame.

According to another aspect of this invention, the frame-merging apparatus is adapted for a mesh network. The mesh network includes a plurality of mesh units and a plurality of terminal units, in which any two units capable of communicating with each other form a communication pair for transmitting a plurality of pending frames. The frame-merging apparatus comprises: a starter designating one of the units as a key unit, and determining whether the key unit is a mesh unit or a terminal unit; a selector which, for the communication pair recorded in each pending frame, selects a suitable scheme from a plurality of frame-merging schemes, and extracts at least one of the pending frames for use as part or all of a priority frame set; and a frame planner comparing a total size of all frames included in the priority frame set with a suitable frame size, so as to determine whether the key unit is to send an aggregated frame.

BRIEF DESCRIPTION OF THE DRAWINGS

Other features and advantages of the present invention will become apparent in the following detailed description of the embodiments with reference to the accompanying drawings, of which.

DETAILED DESCRIPTION OF THE EMBODIMENTS

Before the present invention is described in greater detail with reference to the accompanying embodiments, it should be noted herein that like elements are denoted by the same reference numerals throughout the disclosure.

Referring to FIGS. 1(a) to 1(d), in a typical communication environment, the destination to which a key unit $U_{key}$ transmits a frame may include more than one target unit $U_{target}$, and the key unit $U_{key}$ must conduct communication transmission through at least one relay unit $U_{hop}$. There are four transmission modes, depending on the transmission path recorded by each frame. These include the following:

SDSR (single destination single relay), transmission to a single target unit $U_{target}$ through a single relay unit $U_{hop}$;

MDSR (multiple destinations single relay), transmission to a plurality of target units $U_{target}$ through a single relay unit $U_{hop}$;

SDMR (single destination multiple relays), transmission to a single target unit $U_{target}$ through a plurality of relay units $U_{hop}$; and MDMR (multiple destinations multiple relays), transmission to a plurality of target units $U_{target}$ through a plurality of relay units $U_{hop}$.

To increase throughput, a frame-merging method of the present invention dynamically selects, according to at least one of a bit error rate (BER), a communication pair, and a transmission mode, a suitable frame-merging scheme from among A-MSDU, A-MPDU, and A-PPDU to merge a plurality of frames. Moreover, the method of the present invention references these same parameters, as well as an analysis of flow rate of previous frames to determine the timing of sending merged frames.

First Embodiment

Figure 1A:
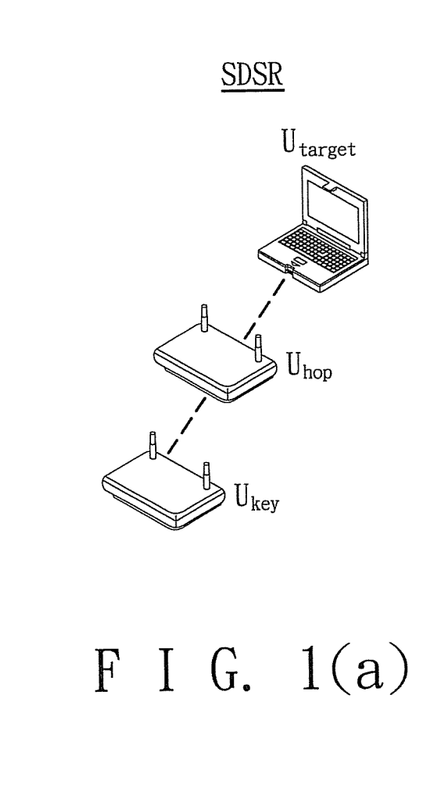
FIGS. 1(a) to 1(d) are schematic diagrams, illustrating four transmission modes.
Figure 1B:
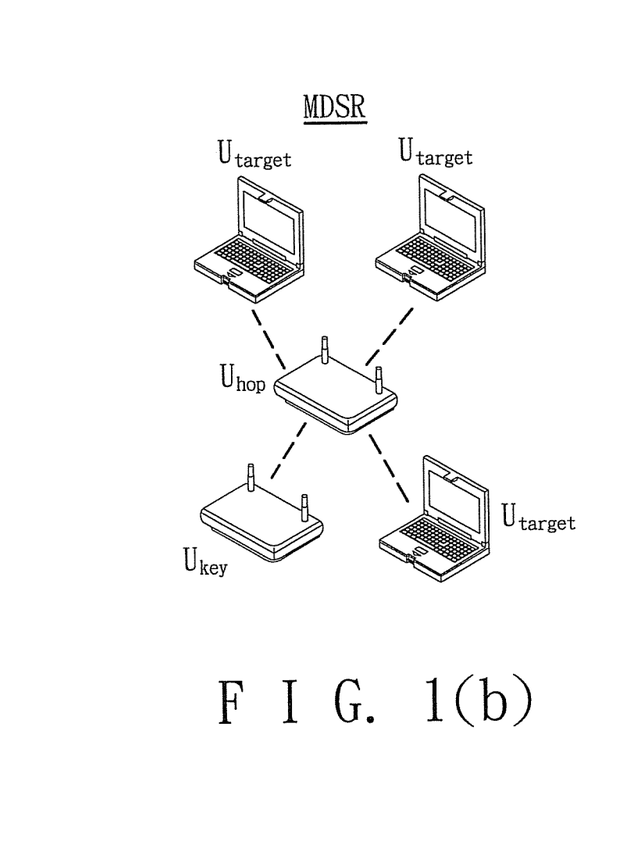
Figure 1C:
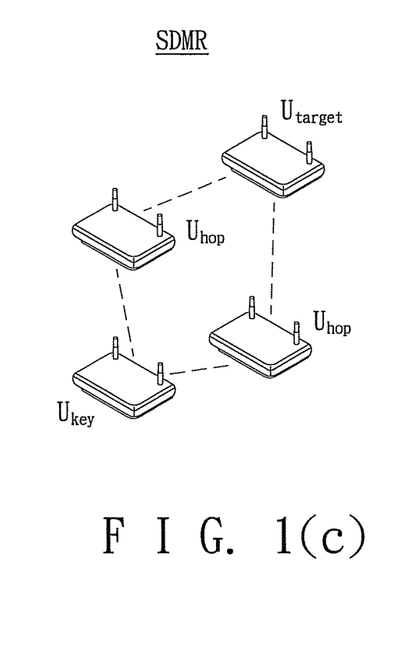
Figure 1D:
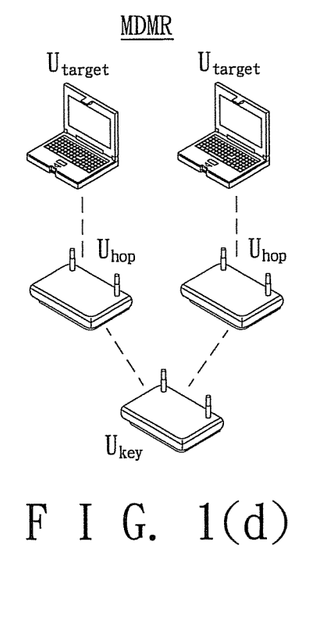
Figure 2:
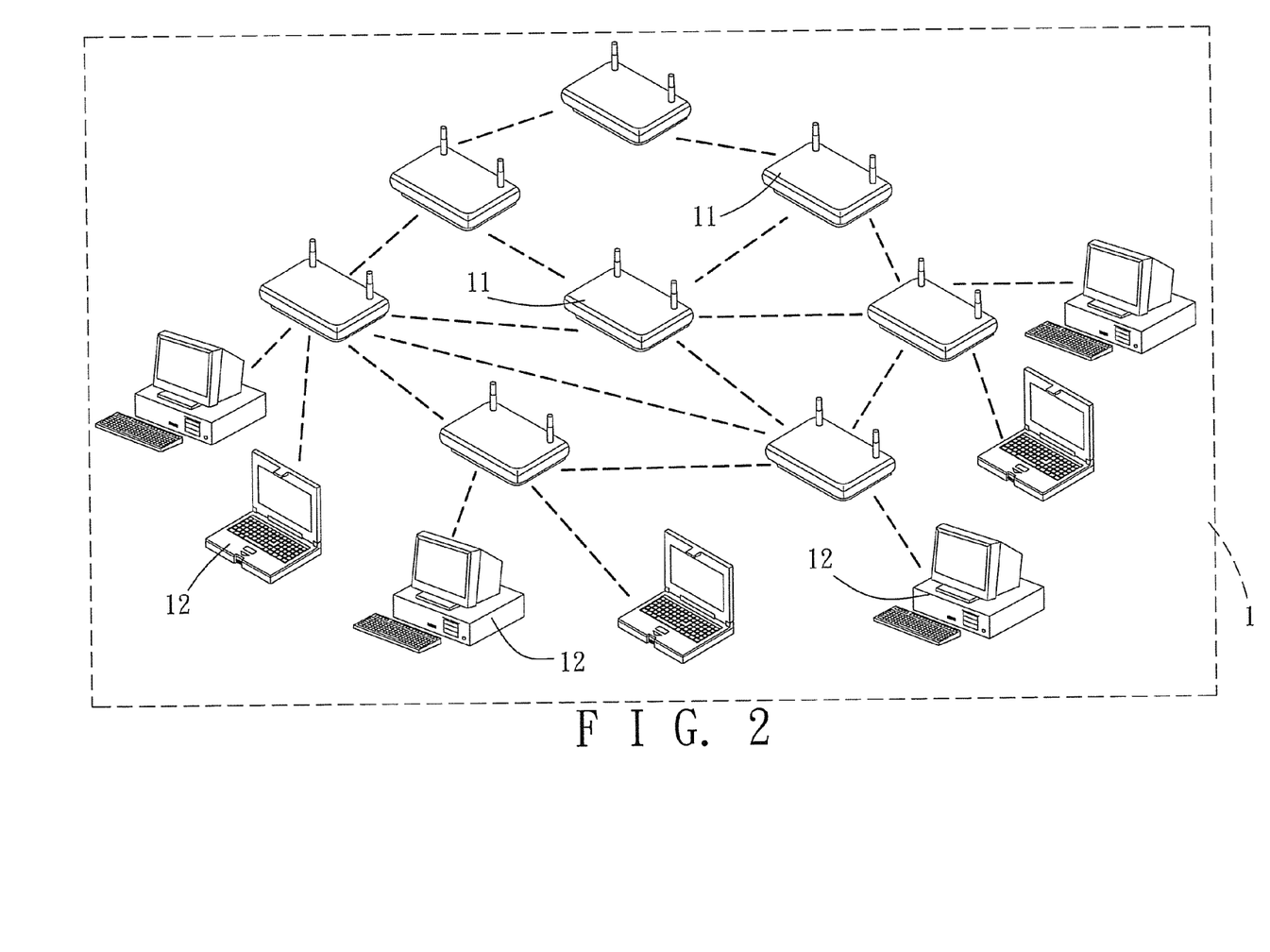
FIG. 2 is a schematic diagram, illustrating a mesh network.

Referring to FIG. 2, the first embodiment of a frame-merging method according to the present invention is adapted to transmit a plurality of pending frames in a mesh network 1. The mesh network 1 includes a plurality of mesh units 11 and a plurality of terminal units 12. Any two units 11, 12 that can communicate with each other are referred to as neighbor nodes, and form a communication pair for transmitting the pending frames. A transmission path recorded in each frame indicates a plurality of communication pairs waiting to conduct communication. There are three types of communication pairs as follows:

M-M, conducting communication from any one mesh unit 11 to any other mesh unit 11;

M-S, conducting communication from any one mesh unit 11 to any one terminal unit 12; and S-M, conducting communication from any one terminal unit 12 to any one mesh unit 11.

In this embodiment, each of the mesh units 11 is a mesh point (MP) or a mesh access point (MAP), and each of the terminal units 12 is a wireless station (STA). The transmission modes suitable for the communication pairs are determined on the basis of the transmission and reception characteristics of the units 11, 12, and are outlined in Table 1. As an example, a terminal unit 12 is able to conduct communication with other units 11, 12 only through a single mesh unit 11, and so S-M may be suitable in SDSR and MDSR.

TABLE 1

|  | M-M | M-S | S-M |
|---|---|---|---|
| SDSR | suitable | suitable | suitable |
| MDSR | suitable | unsuitable | suitable |
| SDMR | suitable | unsuitable | unsuitable |
| MDMR | suitable | suitable | unsuitable |

The number of the relay units $U_{hop}$ and the number of the target units $U_{target}$ needed by the transmission modes are different, and so the suitable frame-merging scheme (A-MSDU, A-MPDU, A-PPDU) is also different. Table 2 below shows efficiency comparison results under ideal channel conditions of transmission modes used by each pair type during application of these schemes.

Three conclusions can be reached from the information provided in Table 2 as follows:

1) The most suitable merging scheme for SDSR is A-MSDU. When using the transmission mode of SDSR, since transmission is performed to a single target unit $U_{target}$ through a single relay unit $U_{hop}$, this conforms with the characteristic of A-MSDU in which a plurality of MSDUs are all directed to the same destination.

2) The most suitable merging scheme for MDSR is A-MPDU. This is because it is necessary to use A-MPDU or A-PPDU when transmission to multiple target units $U_{target}$ is being performed, and A-MPDU has a lower overhead and so has a better transmission efficiency.

3) SDMR and MDMR can only be executed using A-PPDU. This is because only A-PPDU, from among the three frame-merging schemes, permits transmission through different relay units $U_{hop}$.

Figure 3:
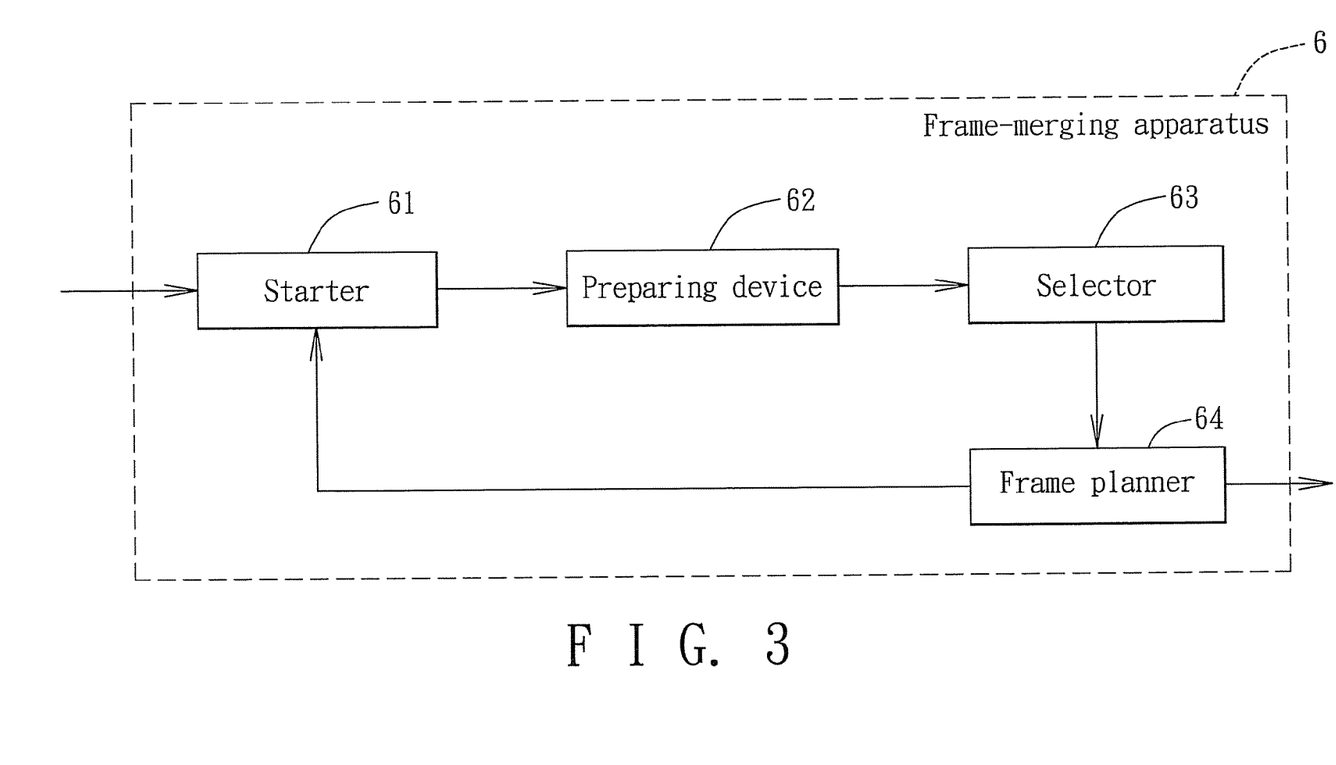
FIG. 3 is a block diagram, illustrating the first embodiment of a frame-merging apparatus according to the present invention.
Figure 4:
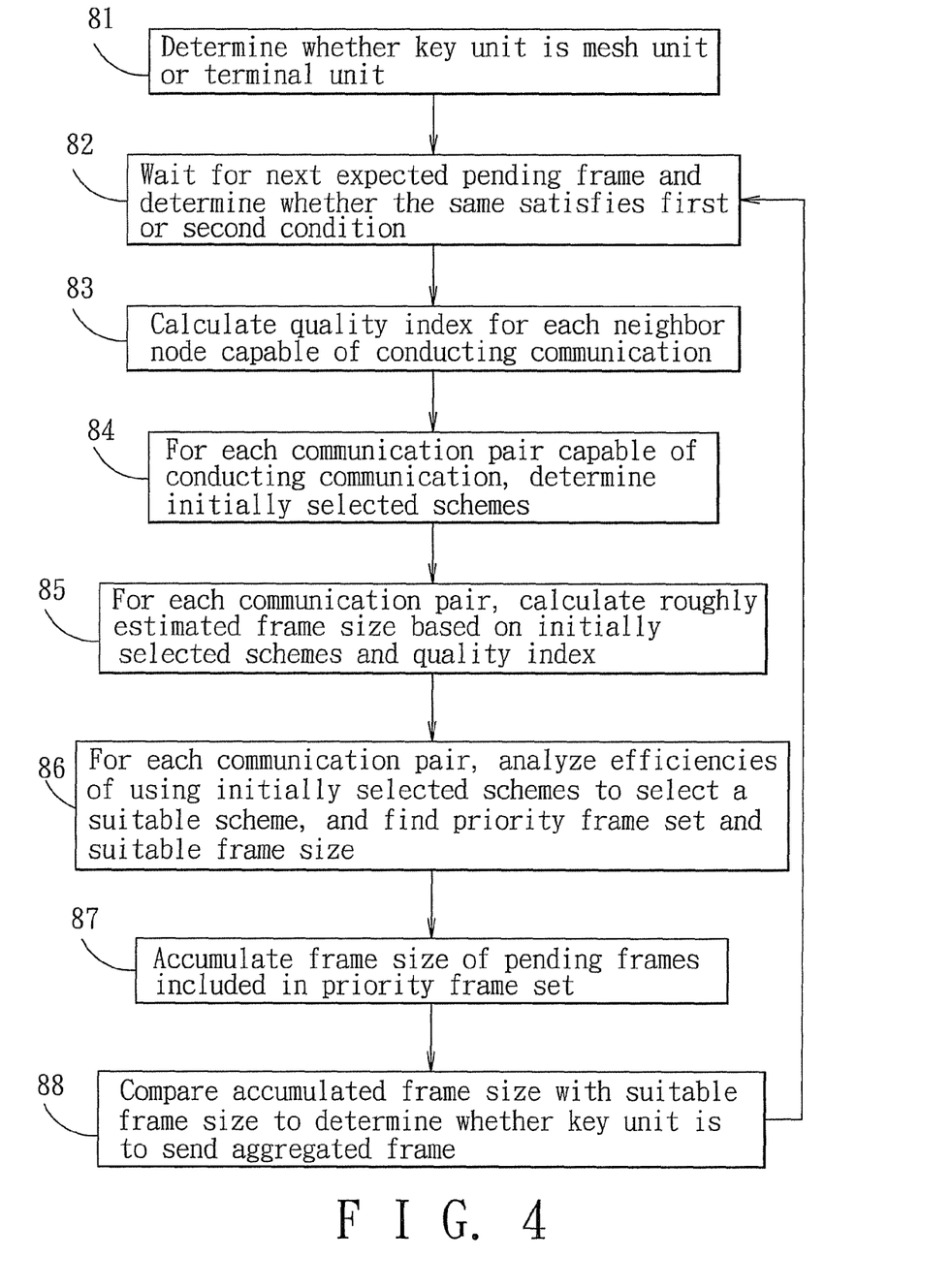
FIG. 4 is a flowchart, illustrating the first embodiment of a frame-merging method according to the present invention.

For a communication pair in the mesh network 1, one of the units 11, 12 (hereinafter referred to as the key unit $U_{key}$) sends pending frames to neighbor nodes only after the pending frames are merged. To increase throughput, the key unit $U_{key}$ uses a frame-merging apparatus 6 of this invention to execute the frame-merging method of this invention to select a suitable merging scheme from among A-MSDU, A-MPDU, and A-PPDU. Referring to FIG. 3, the frame-merging apparatus 6 comprises a starter 61, a preparing device 62, a selector 63, and a frame planner 64. The method comprises the following steps as shown in FIG. 4:

In step 81, the starter 61 determines whether the key unit $U_{key}$ is a mesh unit 11 or a terminal unit 12.

In step 82, the starter 61 waits for the next expected pending frame, and determines whether it satisfies a first condition or a second condition. The flow goes to step 83 only if any one of the two conditions is satisfied.

First condition: the waiting time period exceeds a waiting tolerance value

Second condition: the next expected pending frame has arrived

During initial operation of the frame-merging apparatus 6, the next expected pending frame refers to the next arriving frame. The expected frame type after an amount of time has elapsed is described hereinafter.

In step 83, based on the transmission paths recorded in the pending frames, the preparing device 62 calculates a quality index for each neighbor node capable of conducting communication. In this embodiment, while the bit error rate (BER) is used as the quality index, a signal-to-noise ratio (SNR) may also be used. Moreover, in another embodiment, the preparing device 62 may also calculate the quality index for all neighbor nodes.

In step 84, on the basis of Table 2, for each communication pair capable of conducting communication, the preparing device 62 excludes unsuitable communication modes and frame-merging schemes, and treats the remainder of the frame-merging schemes as being initially selected schemes.

TABLE 2

|  | M-M | | | | M-S | | S-M | |
|---|---|---|---|---|---|---|---|---|
|  | SDSR | MDSR | SDMR | MDMR | SDSR | MDMR | SDSR | MDSR |
| A-MSDU | good | | | | good | | good | |
| A-MPDU | average | good | | | average | | average | good |
| A-PPDU | poor | poor | good | good | poor | good | poor | poor |

For instance, a terminal unit 12 is able to conduct communication through a single mesh unit 11, and so SDMR and MDMR are not suitable for the corresponding communication pair (S-M), and A-PPDU is not selected for obvious reasons. For the communication pairs (M-S) and (M-M), all three of A-MSDU, A-MPDU, and A-PPDU may be selected for the initially selected schemes. In step 85, the selector 63 calculates a roughly estimated frame size for each communication pair that is capable of conducting communication on the basis of the initially selected schemes and the quality index of the neighbor node.

In step 86, for each communication pair capable of conducting communication, the selector 63 analyzes the efficiency of when using any one of the initially selected schemes so as to select a suitable scheme, and finds a priority frame set and a suitable frame size. In this embodiment, the efficiency analysis involves calculating throughput, which is defined as the effective data quantity transmitted during each unit time. The greater the effective data quantity that is transmitted during each unit time, the higher the throughput.

That is, if the effective data quantity transmitted during each unit time is (D), it takes a time period of $$\frac{D}{f_X(D, BER)}$$

to complete a transmission operation, where $f_X(D,BER)$ indicates throughputs $f_{A\text{-}MSDU}(D,BER)$, $f_{A\text{-}MPDU}(D,BER)$, $f_{A\text{-}PPDU}(D,BER)$ for the three schemes, respectively.

Figure 5:
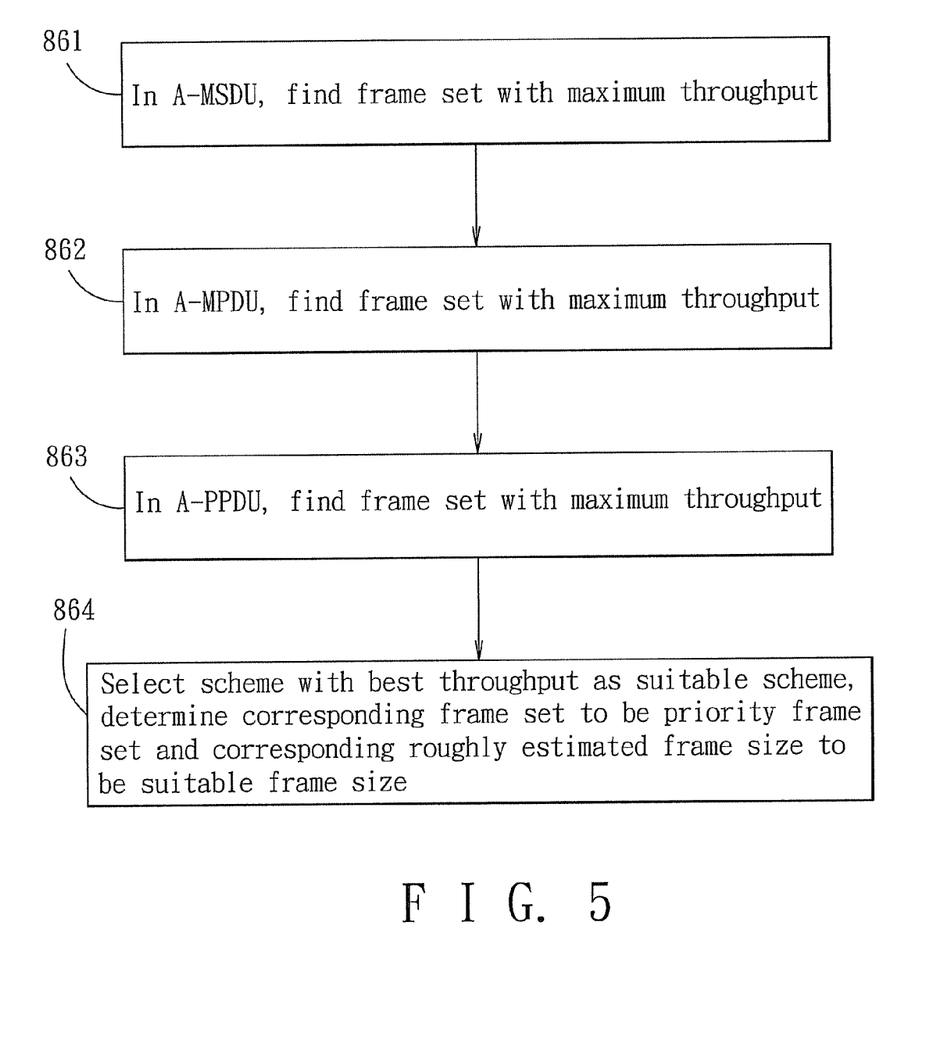
FIG. 5 is a flowchart, illustrating a procedure for selecting a suitable scheme and a priority frame set.

Step 86 includes the following sub-steps shown in FIG. 5.

In sub-step 861, with respect to A-MSDU, only merging of a plurality of frames having the same target unit $U_{target}$ and traffic identifier (TID) value is permitted. Therefore, the selector 63 first divides the pending frames into at least one frame set, next analyzes the throughput $f_{A\text{-}MSDU}(D,BER)$ of each frame set, and then finds the frame set with the maximum throughput.

As known by those skilled in the art, the overhead of each frame records the expected transmission path and the TID values. The TID values are eight different grades defined in IEEE 802.11e for identifying quality of service (QoS) of a frame, and range between 0 and 7. The transmission path includes at least one relay unit $U_{hop}$ or one target unit $U_{target}$ that may be neighbor nodes.

In sub-step 862, with respect to A-MPDU, only the merging of a plurality of frames that pass through the same relay unit $U_{hop}$ is permitted. Therefore, the selector 63 divides the pending frames into at least one frame set according to the relay unit $U_{hop}$, and finds the frame set with the maximum throughput $f_{A\text{-}MPDU}(D,BER)$.

In sub-step 863, with respect to A-PPDU, frame merging is not affected by the relay units $U_{hop}$ or the target units $U_{target}$ in the transmission path. Therefore, the frame set found by the selector 63 includes all pending frames, after which the selector 63 calculates the throughput $f_{A\text{-}PPDU}(D,BER)$ accordingly.

In sub-step 864, the selector 63 compares the throughputs obtained in sub-steps 861 to 863, selects from A-MSDU, A-MPDU, A-PPDU the scheme with the best throughput as the suitable scheme, determines the corresponding frame set to be the priority frame set, and further determines the corresponding roughly estimated frame size to be the suitable frame size.

In step 87, the selector 63 accumulates the frame sizes of the pending frames included in the priority frame set.

In step 88, the frame planner 64 compares the accumulated frame size with a suitable frame size so as to determine whether the key unit $U_{key}$ is to send an aggregated frame, or wait for subsequent pending frames belonging to a priority frame set.

Figure 6:
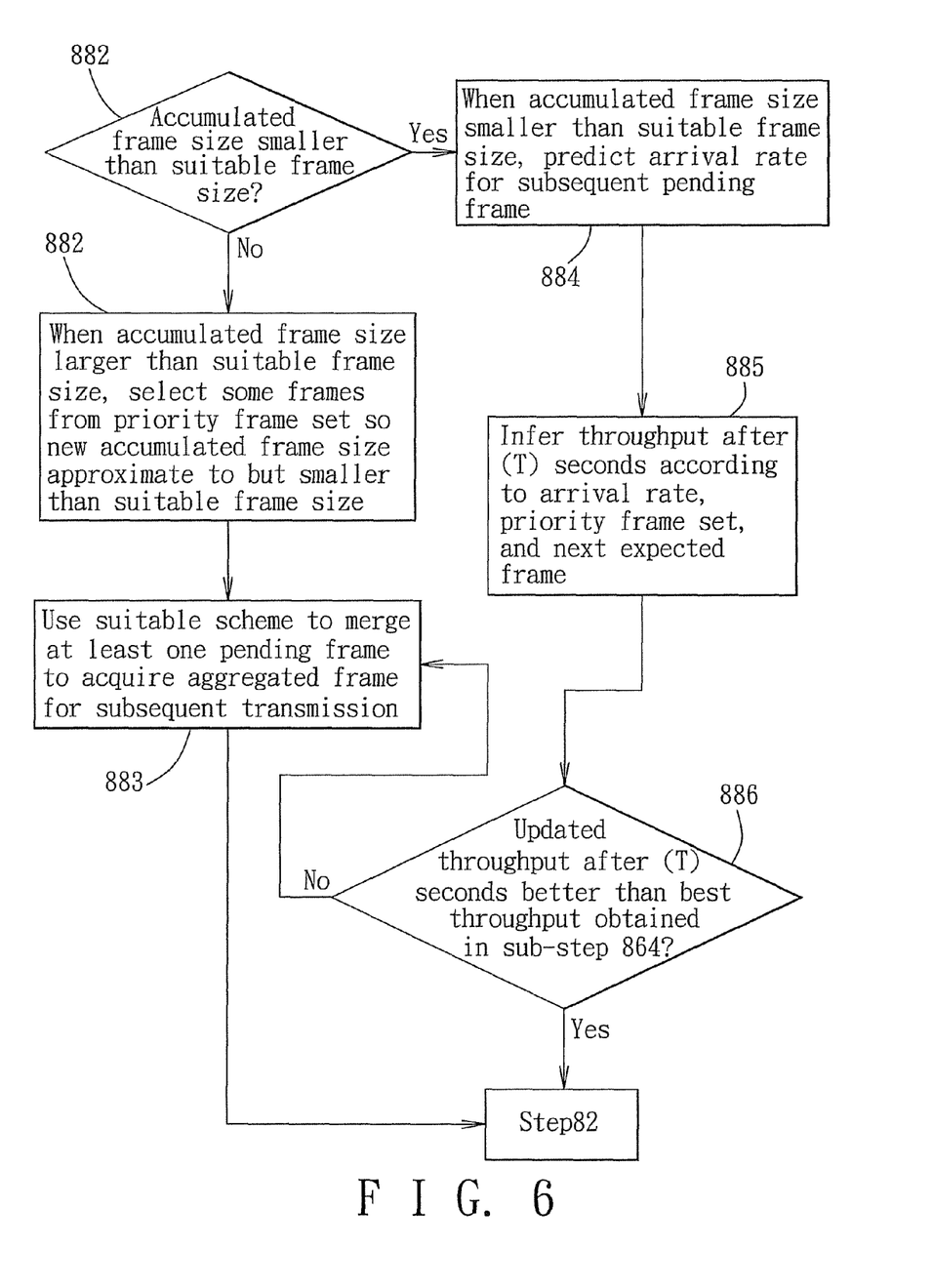
FIG. 6 is a flowchart, illustrating a procedure for determining whether to wait for a subsequent expected pending frame based on a suitable frame size and an accumulated frame size.

Step 88 includes the following sub-steps as shown in FIG. 6.

In sub-step 881, the frame planner 64 determines whether the accumulated frame size is smaller than the suitable frame size. In the affirmative, the flow goes to sub-step 884. Otherwise, the flow goes to sub-step 882.

In sub-step 882, when the accumulated frame size is larger than the suitable frame size, the frame planner 64 selects from the priority frame set some of the frames such that the new accumulated frame size after selection is approximate to but smaller than the suitable frame size.

In A-MSDU, some of the frames are selected from the priority frame set according to the first-in-first-out (FIFO) rule. In A-MPDU and A-PPDU, selection is made according to the TID values, that is, the frames with the highest TID values (high QoS) are selected.

In sub-step 883, the frame planner 64 uses the suitable scheme obtained in sub-step 864 for merging at least one pending frame so as to acquire an aggregated frame for subsequent transmission, after which the flow goes back to step 82.

In greater detail, when the accumulated frame size is larger than the suitable frame size, said at least one pending frame refers to some of the frames selected in sub-step 882. When the accumulated frame size is equal to the suitable frame size, said at least one pending frame refers to all of the frames of the priority frame set.

In sub-step 884, when the accumulated frame size is smaller than the suitable frame size, the frame planner 64 predicts an arrival rate based on the flow rate of previous frames. The arrival rate corresponds to a subsequent pending frame belonging to the priority frame set.

Prediction is performed as follows: for the previous (n) pending frames belonging to the priority frame set (where n is a positive integer), the consumed time is determined, and the effective data quantities carried by these (n) frames are accumulated. Next, the total effective data quantity is divided by the consumed time to obtain the arrival rate (R).

In sub-step 885, based on the suitable scheme, the frame planner 64 infers the throughput after (T) seconds according to the arrival rate, the priority frame set, and the next expected frame.

If it is assumed that the effective data quantity currently carried by the priority frame set is $D_{buffer}$, then inference of the throughput after (T) seconds may be realized in the following manner:

(a) calculate the effective data quantity received after (T) seconds $D_{predict} = R \times T$;

(b) calculate the total effective data quantity expected to be transmitted after (T) seconds as $D_{buffer} + D_{predict}$; and (c) the time needed to send the total effective data quantity is $$\frac{D_{buffer} + D_{predict}}{f_X(D_{buffer} + D_{predict}, BER)},$$

so the updated throughput after (T) seconds may be represented by:

$$TH_{predict} = \frac{D_{buffer} + D_{predict}}{T + \frac{D_{buffer} + D_{predict}}{f_X(D_{buffer} + D_{predict}, BER)}}. \qquad (1)$$

In sub-step 886, the frame planner 64 determines whether the updated throughput after (T) seconds is better than the best throughput obtained in sub-step 864. In the affirmative, the flow goes back to step 82 for awaiting a subsequent expected frame. Otherwise, the flow goes to sub-step 883 to directly merge the priority frame set for subsequent transmission.

It should be noted that, under ideal conditions, going back to step 82 is performed so as to wait for the next expected pending frame in an effort to improve throughput. However, there are instances where a next expected pending frame is not received, in which case throughput is reduced. To avoid such a situation, the first condition (the waiting time period exceeds a waiting tolerance value) is adjusted, so as to avoid waiting without realizing a result.

The manner in which the waiting tolerance value may be obtained is described. As time passes, the waiting tolerance value can be expressed by Formula (2), where LIM is the maximum effective data quantity of the frames sent according to the specifications of the suitable scheme, and max_$f_X$ (BER) is the maximum throughput that can be realized by the suitable scheme.

$$\text{waiting tolerance value} = \frac{\text{LIM}}{f_X(D_{buffer}, BER)} - \frac{D_{buffer}}{\max\_f_X(BER)} \qquad (2)$$

Second Embodiment

It may be determined from the foregoing that sub-step 884 in the first embodiment only predicts the arrival rate of the frames belonging to the priority frame set, and sub-step 885 only infers the throughput of the suitable scheme.

In order to perform an evaluation of whether a subsequent frame may make the throughput better than the priority frame set presently selected, sub-steps 884 to 886 are altered in the second embodiment to sub-steps 884' to 886' as outlined below.

In sub-step 884', the frame planner 64 predicts a plurality of arrival rates on the basis of the flow rate of the previous pending frames, and each arrival rate corresponds to a next pending frame belonging to the aforementioned each frame set.

In sub-step 885', for the next arriving pending frames, the frame planner 64 determines to which frame set they belong, and infers the throughput after (T) seconds.

In sub-step 886', this throughput and the best throughput obtained in sub-step 864 are compared. If the throughput of sub-step 885' is better, the related frame set is regarded as the updated priority frame set, and the flow goes back to step 82 to await the next arriving frame. If the throughput of sub-step 885' is worse, then the flow goes to sub-step 883 of directly merging the priority frame set for subsequent transmission.

In another embodiment, in sub-step 885', waiting is performed for the next p-number of arriving pending frames, and the throughputs are inferred for comparison in sub-step 886'.

Moreover, it is to be noted that, in the aforementioned embodiments, step 85 may be omitted, and prior to step 88, the suitable frame size is calculated directly according to the suitable scheme and the quality indices of the neighbor nodes directed by the priority frame set. Furthermore, throughput comparison need not be performed in sub-steps 861 and 862, and the throughputs of all frame sets may be directly compared in sub-step 864.

Additionally, in yet another embodiment, step 84 can be omitted, and the all the frame-merging schemes (i.e., A-MSDU, A-MPDU, and A-PPDU) may be considered for the operations performed after step 85.

In sum, in the frame-merging method of this invention, the key unit $U_{key}$ selects from a plurality of frame-merging schemes (e.g., A-MSDU, A-MPDU, and A-PPDU) the frame-merging scheme that has the best throughput as the suitable scheme, and evaluates an index (e.g., the bit error rate) of the neighbor nodes of the key unit $U_{key}$ for use in obtaining a suitable frame size so as to determine whether to wait and merge the next expected pending frame, thereby enhancing throughput. As a result, the object of this invention is realized.

It is noted that while in the foregoing embodiments, the frame-merging scheme that has the best throughput is selected from a plurality of frame-merging schemes (e.g., A-MSDU, A-MPDU and A-PPDU) as the suitable scheme, the present invention is not limited in this regard. Those skilled in the art related to this invention can select the suitable scheme according to other available frame-merging schemes and/or network transmission characteristics (for instance, simultaneously based on the throughput and the characteristics of the frames, such as frame transmission priorities).

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A frame-merging method adapted for a network, the network including a plurality of mesh units and a plurality of terminal units, in which any two units capable of communicating with each other form a communication pair, and one of the units operates as a key unit to transmit a plurality of pending frames according to said frame-merging method, said frame-merging method comprising:
   (A) determining whether the key unit is a mesh unit or a terminal unit;
   (B) for the communication pair recorded in each pending frame, selecting a suitable scheme from a plurality of frame-merging schemes, and extracting at least one of the pending frames from among the pending frames for use as part or all of a priority frame set; and
   (C) comparing a total size of all frames included in the priority frame set with a suitable frame size, so as to determine whether the key unit is to send an aggregated frame.

2. The method of claim 1, wherein the communication pair recorded by the frames of the priority frame set being directed to least one neighbor node, said method further comprising, before said step (C):
   (D) calculating a quality index for each related communication pair;
   wherein the suitable frame size used for comparison in step (C) is calculated according to the suitable scheme and the quality index of the communication pair directed by the priority frame set.

3. The method of claim 1, wherein the frame-merging schemes comprise at least one of aggregated media access control service data unit (A-MSDU), aggregated media access control protocol data unit (A-MPDU), and aggregated physical packet data unit (A-PPDU);

said method further comprising, before said step (B):

(E) selecting a plurality of initially selected schemes from the frame-merging schemes.

4. The method of claim 3, wherein the step (B) includes:

when one of the initially selected schemes is A-MSDU, dividing the pending frames into at least one frame set according to a target unit and a traffic identifier recorded in each pending frame;

when one of the initially selected schemes is A-MPDU, dividing the pending frames into at least one frame set according to a relay unit recorded in each pending frame;

when one of the initially selected schemes is A-PPDU, placing the pending frames into the same frame set; and analyzing the efficiency of each frame set so as to find the frame set with a suitable efficiency for use as the priority frame set, and to regard the corresponding scheme as the suitable scheme.

5. The method of claim 1, wherein step (C) includes:

accumulating the frame sizes of the pending frames included in the priority frame set so as to acquire an accumulated frame size;

when the accumulated frame size is larger than the suitable frame size, selecting some of the frames from the priority frame set, and forming the aggregated frame using the suitable scheme; and when the accumulated frame size is equal to the suitable frame size, using the suitable scheme to merge the priority frame set into the aggregated frame.

6. The method of claim 4, wherein step (C) includes:

accumulating the frame sizes of the pending frames included in the priority frame set so as to obtain an accumulated frame size; and when the accumulated frame size is smaller than the suitable frame size, predicting a plurality of arrival rates based on a flow rate of at least one of the previous pending frames, each arrival rate corresponding to a subsequent pending frame belonging to said each frame set.

7. The method of claim 6, wherein step (C) further includes:

inferring an updated efficiency after elapse of a predetermined time period according to the arrival rates, the pending frames, and a subsequent pending frame belonging to any frame set;

when the updated efficiency is good, regarding the frame set with a suitable efficiency as an updated priority frame set, and executing step (B) to wait for a subsequent pending frame belonging to the updated priority frame set; and when the updated efficiency is poor, using the suitable scheme to merge the non-updated priority frame set to form the aggregated frame for subsequent transmission.

8. The method of claim 1, wherein step (C) includes:

accumulating the frame sizes of the pending frames included in the priority frame set so as to obtain an accumulated frame size; and when the accumulated frame size is smaller than the suitable frame size, predicting an arrival rate based on a flow rate of at least one previous pending frame, the arrival rate corresponding to a subsequent pending frame belonging to the priority frame set.

9. The method of claim 8, wherein step (C) further includes:

inferring an updated efficiency after elapse of a predetermined time period according to the arrival rate, the priority frame set, and a subsequent pending frame belonging to the priority frame set;

when the updated efficiency is good, executing step (B) to wait for a subsequent pending frame belonging to the priority frame set; and when the updated efficiency is poor, using the suitable scheme to merge the priority frame set to form the aggregated frame for subsequent transmission.

10. A frame-merging apparatus adapted for a network, the network including a plurality of mesh units and a plurality of terminal units, in which any two units capable of communicating with each other form a communication pair for transmitting a plurality of pending frames, said frame-merging apparatus comprising:

a starter designating one of the units as a key unit, and determining whether the key unit is a mesh unit or a terminal unit;

a selector which, for the communication pair recorded in each pending frame, selects a suitable scheme from a plurality of frame-merging schemes, and extracts at least one of the pending frames for use as part or all of a priority frame set; and a frame planner comparing a total size of all frames included in the priority frame set with a suitable frame size, so as to determine whether the key unit is to send an aggregated frame.

11. The apparatus of claim 10, the communication pair recorded by the frames of the priority frame set being directed to at least one neighbor node;

wherein said frame-merging apparatus further comprises a preparing device for calculating a quality index for each related communication pair before said frame planner compares the frame size; and wherein the suitable frame size used by said frame planner for comparison is calculated according to the suitable scheme and the quality index of the communication pair directed by the priority frame set.

12. The apparatus of claim 10, wherein the frame-merging schemes comprise at least one of aggregated media access control service data unit (A-MSDU), aggregated media access control protocol data unit (A-MPDU), and aggregated physical packet data unit (A-PPDU);

said frame-merging apparatus further comprises a preparing device for selecting a plurality of initially selected schemes from the frame-merging schemes;

when one of the initially selected schemes is A-MSDU, said selector divides the pending frames into at least one frame set according to a target unit and a traffic identifier recorded in each pending frame;

when one of the initially selected schemes is A-MPDU, said selector divides the pending frames into at least one frame set according to a relay unit recorded in each pending frame;

when one of the initially selected schemes is A-PPDU, said selector places the pending frames into the same frame set; and said selector analyzes the efficiency of each frame set so as to find the frame set with a suitable efficiency for use as the priority frame set, and to regard the corresponding scheme as the suitable scheme.

13. The apparatus of claim 10, wherein said selector accumulates the frame sizes of the pending frames included in the priority frame set so as to obtain an accumulated frame size;

when the accumulated frame size is larger than the suitable frame size, said frame planner selects some of the frames from the priority frame set, and forms the aggregated frame using the suitable scheme; and when the accumulated frame size is equal to the suitable frame size, said frame planner uses the suitable scheme to merge the priority frame set into the aggregated frame.

14. The apparatus of claim 12, wherein said selector accumulates the frame sizes of the pending frames included in the priority frame set so as to obtain an accumulated frame size; and when the accumulated frame size is smaller than the suitable frame size, said frame planner predicts a plurality of arrival rates based on a flow rate of at least one of the previous pending frames, each arrival rate corresponding to a subsequent pending frame belonging to said each frame set.

15. The apparatus of claim 14, wherein said frame planner infers an updated efficiency after elapse of a predetermined time period according to the arrival rates, the pending frames, and a subsequent pending frame belonging to any frame set;

when the updated efficiency is good, said frame planner regards the frame set with a suitable efficiency as an updated priority frame set, and waits for a subsequent pending frame belonging to the updated priority frame set; and when the updated efficiency is poor, said frame planner uses the suitable scheme to merge the non-updated priority frame set to form the aggregated frame for subsequent transmission.

16. The apparatus of claim 10, wherein said selector accumulates the frame sizes of the pending frames included in the priority frame set so as to obtain an accumulated frame size; and when the accumulated frame size is smaller than the suitable frame size, said frame planner predicts an arrival rate based on a flow rate of at least one previous pending frame, the arrival rate corresponding to a subsequent pending frame belonging to the priority frame set.

17. The apparatus of claim 16, wherein said frame planner infers an updated efficiency after elapse of a predetermined time period according to the arrival rate, the priority frame set, and a subsequent pending frame belonging to the priority frame set;

when the updated efficiency is good, said frame planner waits for a subsequent pending frame belonging to the priority frame set; and when the updated efficiency is poor, said frame planner uses the suitable scheme to merge the priority frame set to form the aggregated frames for subsequent transmission.

18. A frame-merging method adapted for a network, the network including a plurality of mesh units and a plurality of terminal units, in which any two units capable of communicating with each other form a communication pair, said frame-merging method comprising:

determining, in one of the any two units, a type of the communication pair according to a transmission path recorded in each frame;

selecting, in the one of the any two units based on the type of the communication pair, a suitable scheme from a plurality of frame-merging schemes according to the type of the communication pair; and merging, in the one of the any two units, a plurality of frames according to the suitable scheme.

19. The method of claim 18, wherein the frame-merging schemes comprise at least one of aggregated media access control service data unit (A-MSDU), aggregated media access control protocol data unit (A-MPDU), and aggregated physical packet data unit (A-PPDU).

20. The method of claim 18, wherein the type of the communication pair comprises an M-M type, an M-S type, and an S-M type, wherein the M-M type represents communication from any one mesh unit to any other mesh unit;

wherein the M-S type represents communication from any one mesh unit to any one terminal unit; and wherein the S-M type represents communication from any one terminal unit to any one mesh unit.

* * * * *